July 21, 1953   A. NUSSBAUM ET AL   2,646,177
DEVICE FOR STORING AND CONVEYING CONTAINERS
Filed March 20, 1947   8 Sheets-Sheet 5
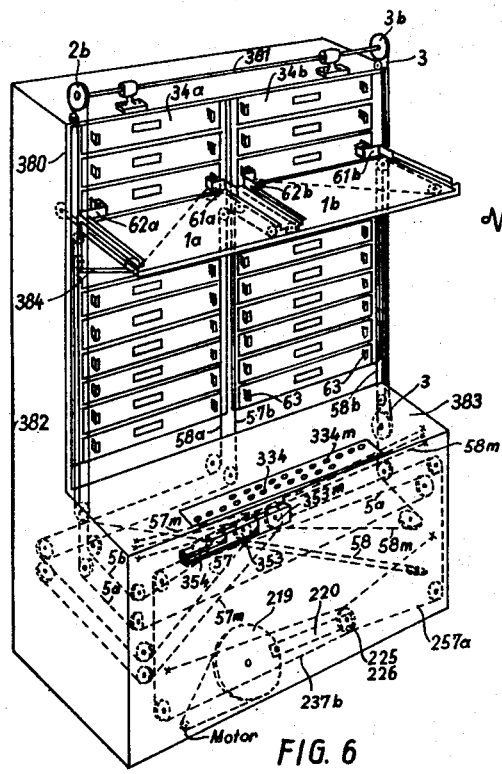
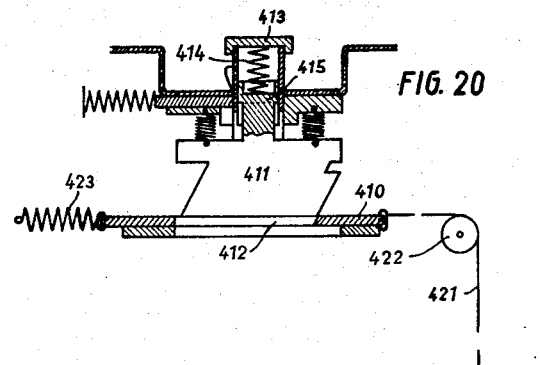
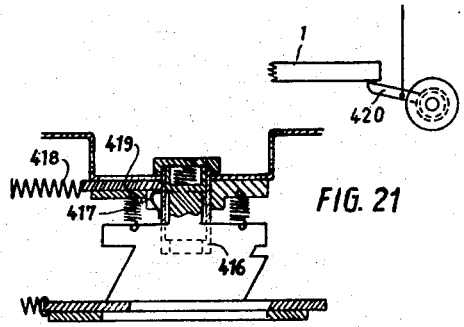
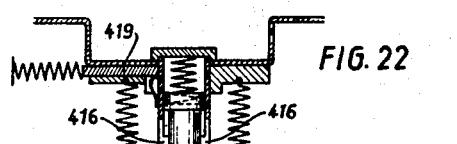
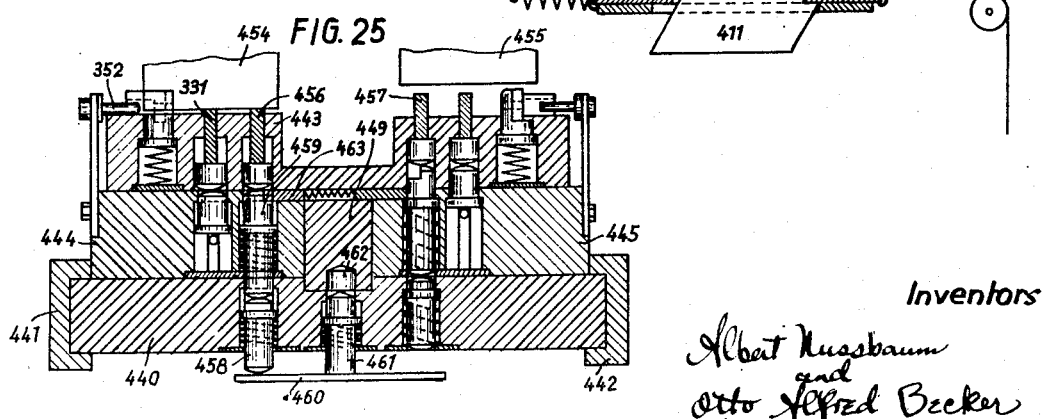
Inventors
Albert Nussbaum
and
Otto Alfred Becker
By Alexander Nowell
attorneys July 21, 1953  A. NUSSBAUM ET AL  2,646,177
DEVICE FOR STORING AND CONVEYING CONTAINERS
Filed March 20, 1947  8 Sheets-Sheet 6
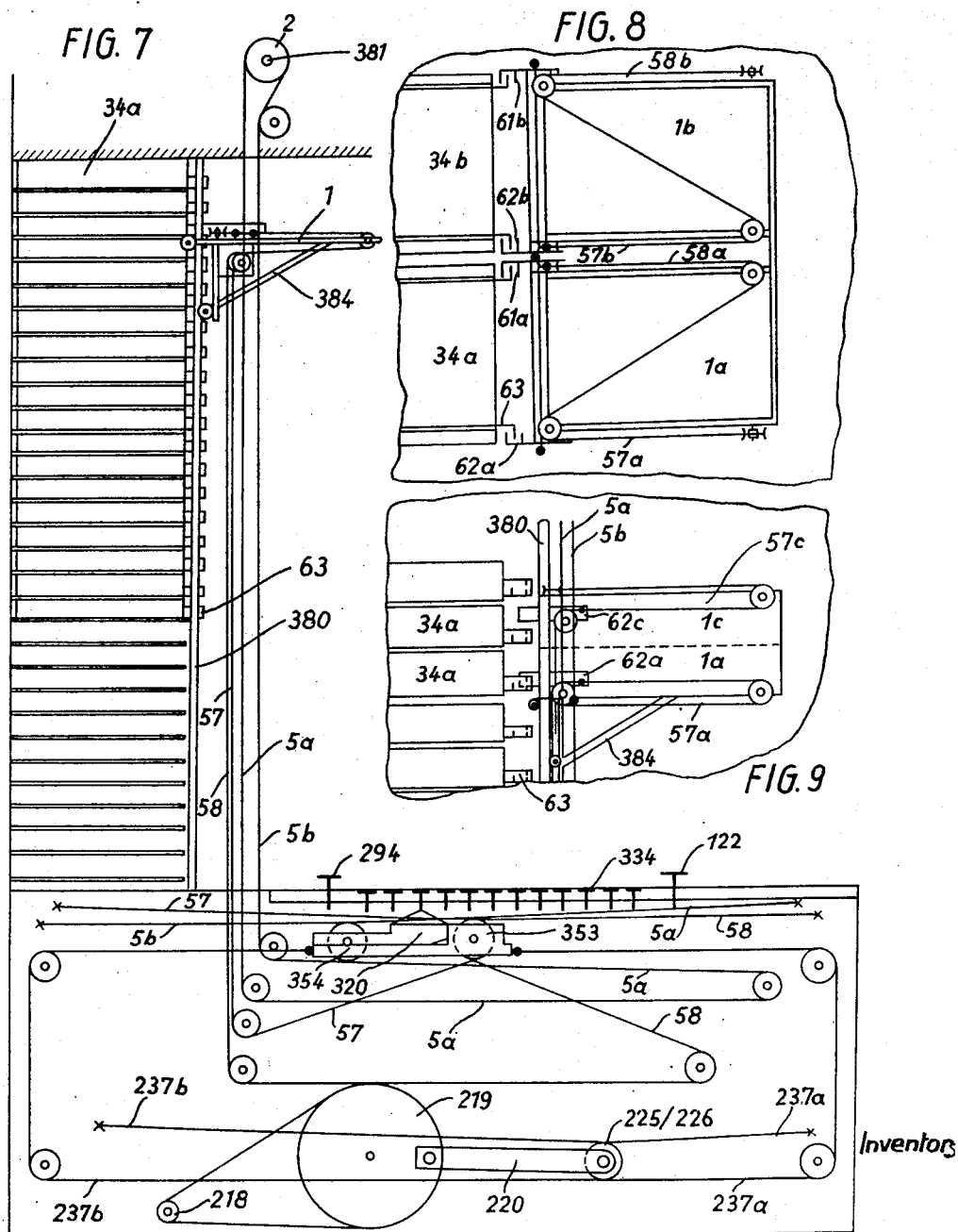

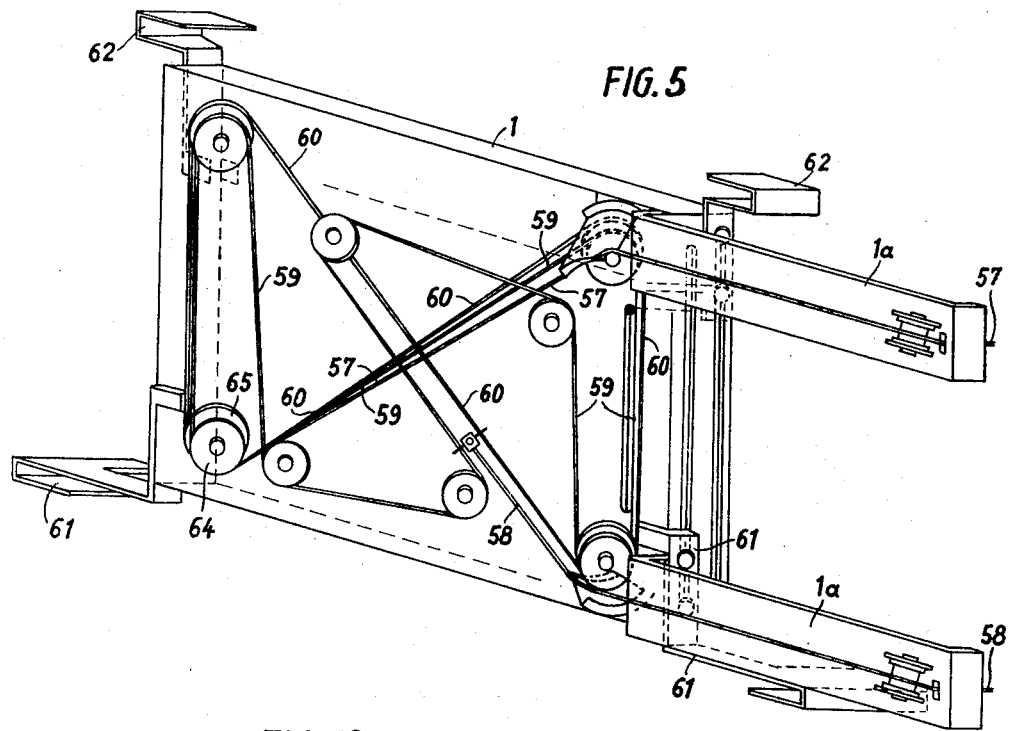

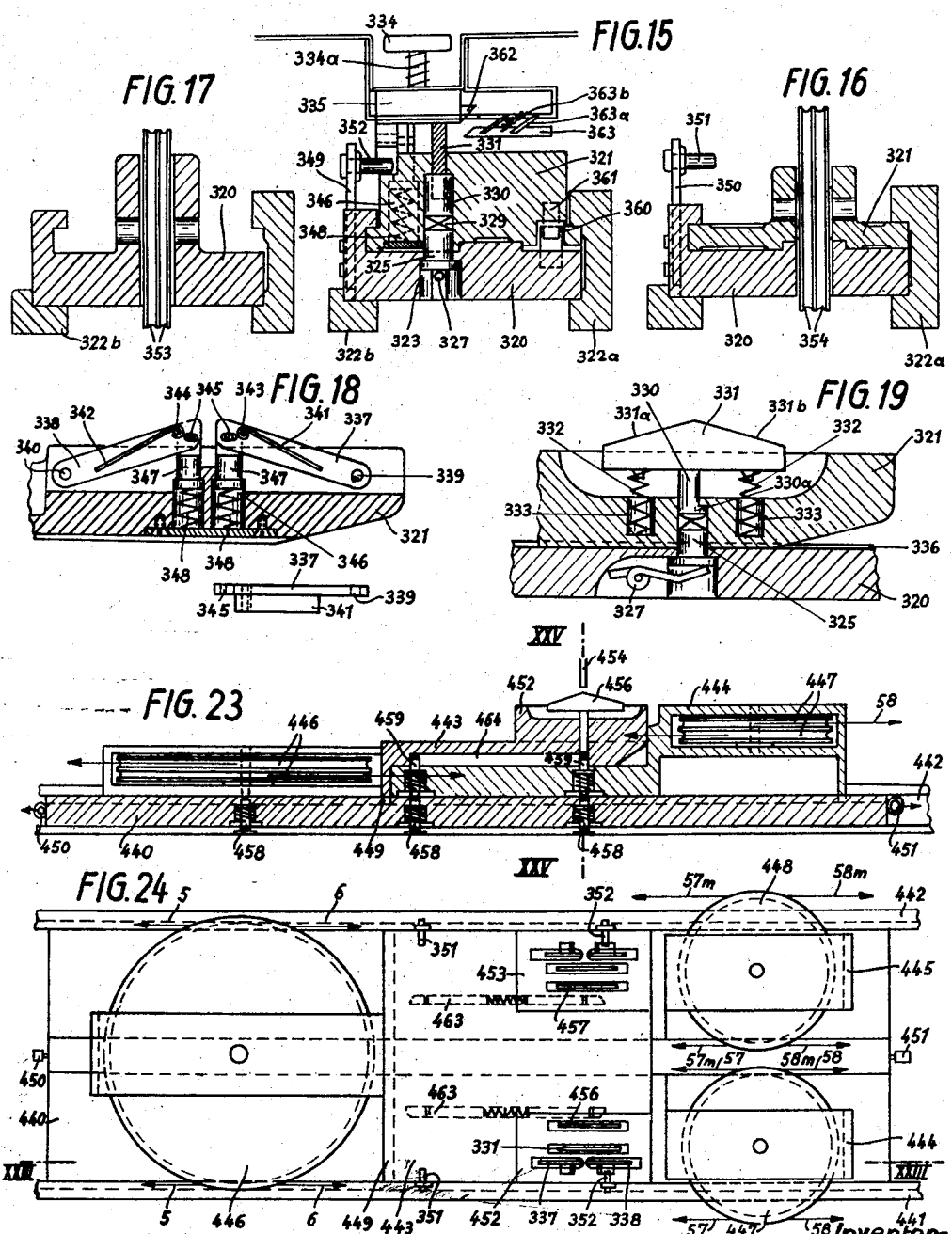

July 21, 1953 A. NUSSBAUM ET AL 2,646,177
DEVICE FOR STORING AND CONVEYING CONTAINERS
Filed March 20, 1947 8 Sheets-Sheet 8
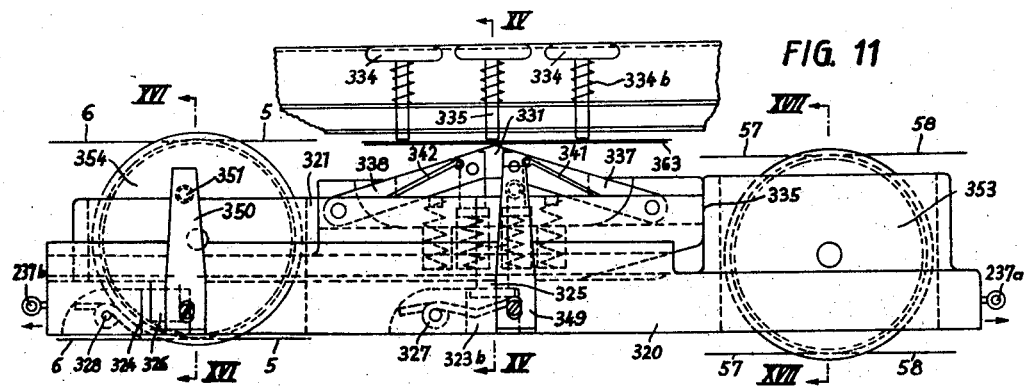
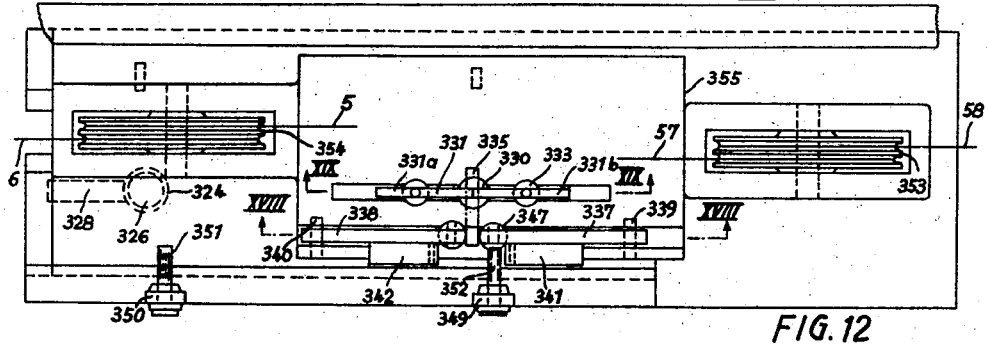
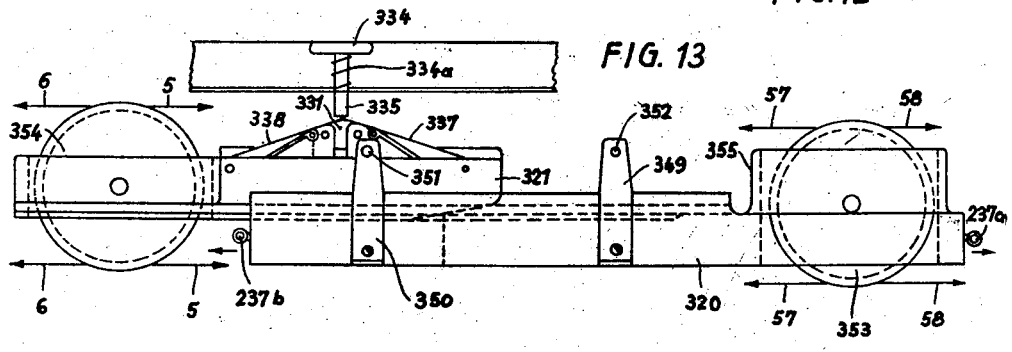
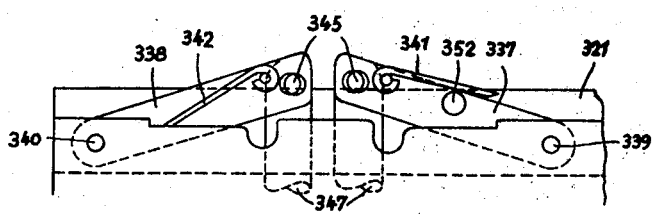

Patented July 21, 1953

2,646,177

UNITED STATES PATENT OFFICE 2,646,177

DEVICE FOR STORING AND CONVEYING CONTAINERS

Albert Nussbaum, Montigny-les-Metz, France, and Otto Alfred Becker, Saarbrucken, Germany; said Becker assignor to said Nussbaum Application March 20, 1947, Serial No. 736,084
In Switzerland April 2, 1946

14 Claims. (Cl. 214—11)

This invention relates to an improved apparatus for storing and conveying containers for index cards and other objects, the containers being arranged one above the other in stationary stacks or piles, and means being provided whereby each container may be automatically conveyed from its rest or storage position to a working position and back again.

In known apparatus of this nature, the containers are conveyed by means of a carrier plate which is moved in vertical direction along vertical guides. The carrier plate is initially moved from a position of rest only up to the level of a selected container, where its movement is stopped, the selected container being then transported onto the carrier plate by lateral displacement, whereupon the carrier plate is further moved until it arrives in its final position at the level of a working place. When returning the selected container to its position of rest, the elements are moved in the reverse order, the carrier plate being initially moved to the storage position of the respective container in the stack, the container being then shifted laterally to its storage position, and the carrier plate then being returned alone to its initial position. In known apparatus of this nature, the movements of the carrier plate are controlled by means of stops which are co-ordinated to the storage places of the containers and which are operated by means of keys for projecting same into the path of the carrier plate, and the lateral movements of the containers from their storage positions onto the carrier plate and back again into the stack are controlled by movable drivers which are displaceably arranged at the sides of the carrier plate in such manner as to engage the selected container when the carrier plate is in its position of rest at the level of the selected container.

The present invention has for its primary object to provide simplified means for the drive and for the control of the movements of the carrier plate as well as of the drivers arranged on this plate and co-operating with the containers.

Another object of the invention is to render an apparatus of the kind described more effective by such arrangement of the carrier plate that it is adapted for conveying containers from different stacks or piles or to take up and to convey several containers in one conveying operation of the plate.

These and other objects and advantages of the invention will be apparent from the following description of practical embodiments of the invention illustrated diagrammatically in the accompanying drawings, wherein:

Fig. 5 is a perspective view of the carrier plate alone, seen from below and on a still larger scale.

Fig. 6 is a perspective view of an apparatus casing in the form of a shelf provided with two stacks of containers and showing a carrier plate for two containers.

Fig. 7 is a diagrammatic side view of the shelf on a larger scale, the lower part of the shelf being shown in a position turned through 90° for the purpose of better illustration.

Fig. 8 is a view of the carrier plate of the shelf seen from below, with the driving means for laterally shifting and vertically conveying two containers side by side selected from two stacks.

Fig. 9 is a side elevation of a double carrier plate arranged for conveying two containers one above the other.

Fig. 10 is a perspective view of the main driving means for the rope gears.

Fig. 11 is a side elevation of a steering slide co-operating with the selector keys and controlling the carrier plate.

Fig. 12 is a top plan view of the slide shown in Fig. 11.

Fig. 13 is a side elevation of the slide in a displaced position of its elements.

Fig. 14 is a side elevation of a detail of Fig. 13 on a larger scale.

Figs. 15 to 17 are sections taken on the lines XV—XV, XVI—XVI and XVII—XVII respectively of Fig. 11.

Figs. 18 and 19 are longitudinal sections through details taken on the lines XVIII—XVIII and XIX—XIX, respectively of Fig. 12.

Figs. 20-22 are detail views which show the construction of a selector key in various working positions.

Figs. 23, 24 and 25 show a steering slide for a double carrier plate for the conveyance of two containers, Fig. 23 being a longitudinal section on the line XXIII—XXIII of Fig. 24, which is a plan view, and Fig. 25 being a cross-section to a larger scale taken on the line XXV—XXV of Fig. 23.

Figure 1:
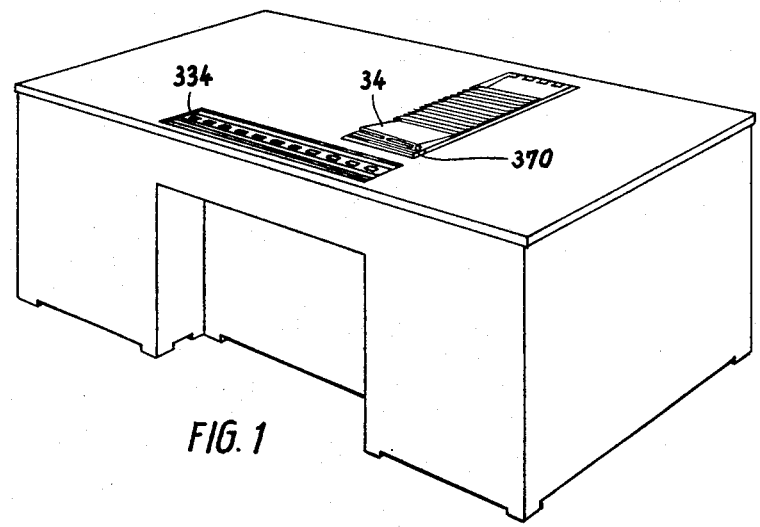
Figure 1 is a perspective view of an apparatus casing in the form of a writing table.

As shown in Fig. 1 the apparatus according to the invention may be in the form of a writing table containing e. g. two stacks of containers for index cards and a conveying device by means of which each of the card containers of each stack may be conveyed from its storing plate in one of the stacks into an opening 370 of the table top constituting the working place of the containers. The table top is also provided with a series of selector keys 334 by means of which the container to be conveyed is selected. When no container is present in the opening or window 370 of the table top, the opening may be closed by laterally displaceable plates 401 (Fig. 2), the control and drive of which will be described later. The arrangement of the two stacks of containers 34 within the table, and of the carrier plate 1 disposed between the two container stacks, and of a rope gear with steering mechanism constituted by a horizontally displaceable slide 320, 321 cooperating with the selectors keys 334 is shown in Fig. 3, the elements and their co-operation being described later in detail.

According to Fig. 6 the apparatus may also be constructed in the form of a shelf 382 in which the containers 34a, 34b for index cards or other objects are disposed in two stacks side by side above a working place 383 which includes the selector keys 334. In this case the containers have to be moved downwards for coming into the working position, and this conveyance is effected by a carrier plate 1a, 1b which is constructed as a double plate for conveying two containers in one operation, said double plate running along vertical guide rails 380 at the front side of the shelf and being driven and controlled by a rope gear and by a steering slide which in their general operation correspond with the driving gear of the table apparatus which now will be described in greater detail.

Figure 3:
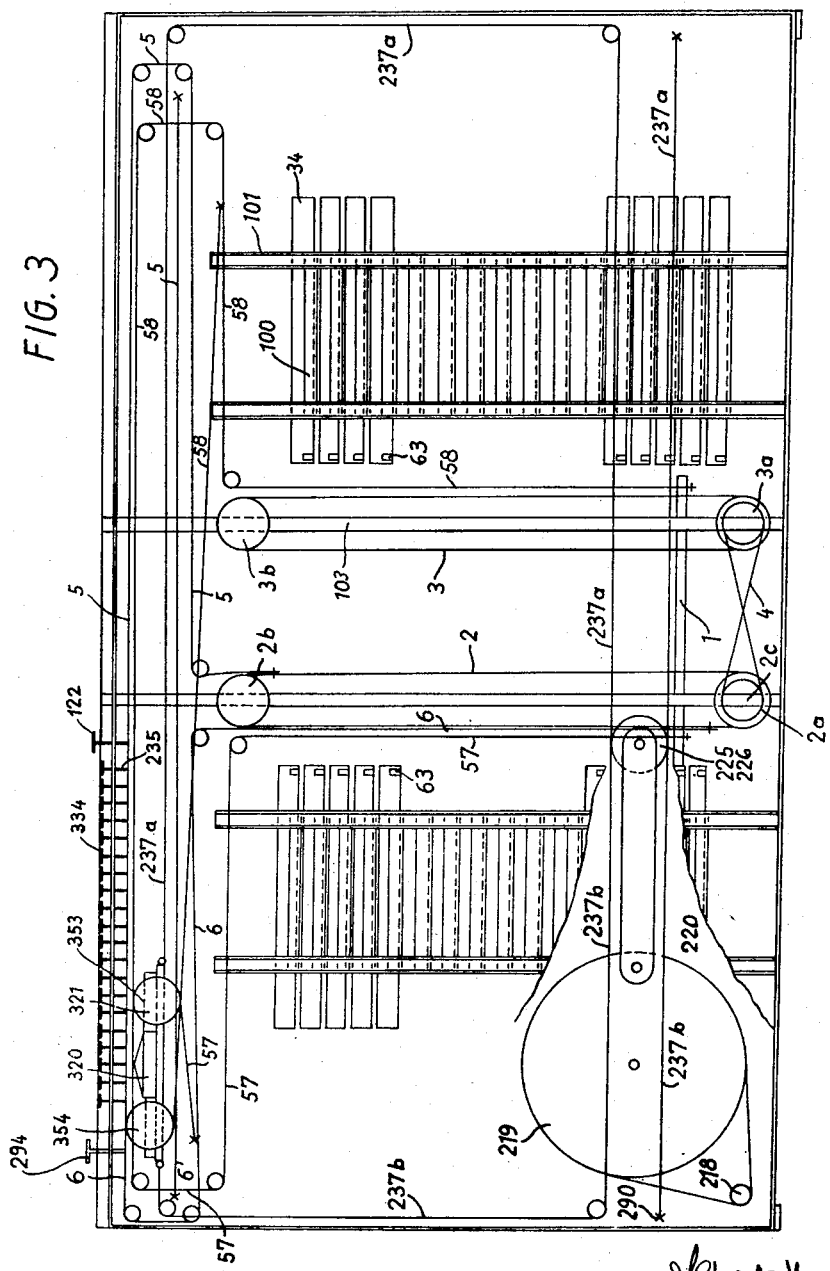
Fig. 3 is a diagrammatic longitudinal vertical section of the table showing the container stacks, the carrier plate therebetween, its gears as well as the driving means, the controlling means and the keys to be operated for the selection of the containers, combining them all in one view.
Figure 4:
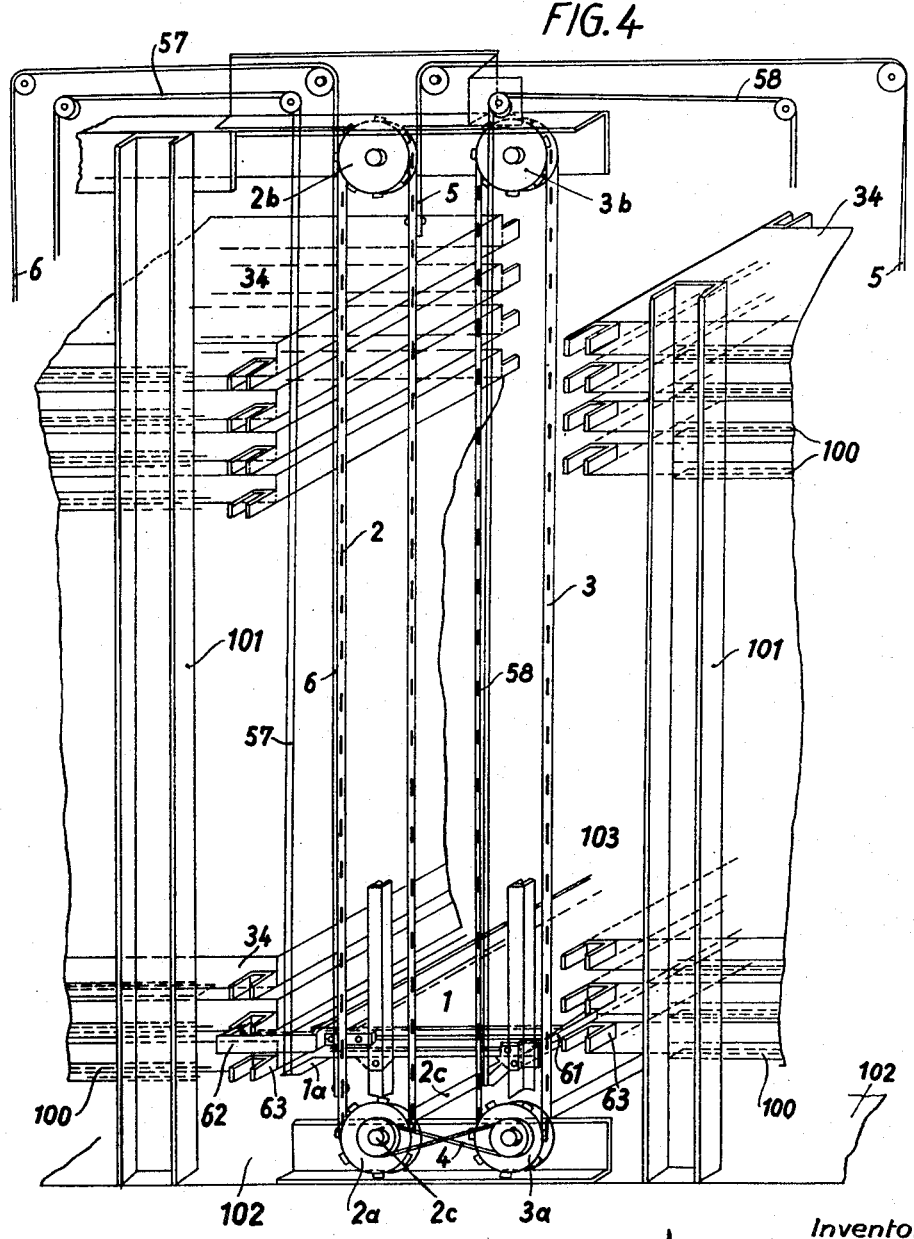
Fig. 4 is a perspective view of the lifting mechanism of the carrier plate shown on an enlarged scale.

As shown in Figs. 3 and 4, the containers 34 of the table apparatus are arranged one above the other at the left and the right sides of the table casing and are supported by a series of horizontal carrier rails 100 which are fixed to vertical frame rails 101. The horizontal rails 100 constitute the rest or storage places for the containers 34. The frame construction formed by the rails 100 and 101 rests on a base plate 102. Between the two container stacks is provided a free space which accommodates a conveyor mechanism for lifting and lowering the carrier plate 1 and comprises said plate 1, endless perforated belts 2 and 3 which are led around cam wheels 2a, 2b and 3a, 3b, a crossed belt 4 and belts 5 and 6, which, for the purpose of transmitting the drive, are fixed in staggered relation to the belt 2 at the top and bottom thereof. By means of the crossed belt 4 and the wheel 3a movement is transmitted to the belt 3. The carrier plate 1 is attached to the belts 2 and 3 in such a manner that it is moved up and down by the reciprocating movement of the belts.

This elevator mechanism is the same at the front and the back of the apparatus, the two parts being connected by a shaft 2c.

The ends of straps 57 and 58 are linked to endless straps 59 and 60 (Fig. 5) passing around the fixed rollers 64 and 65 below the carrier plate 1. These endless straps 59 and 60 are fitted with drivers 61 and 62. At the point where the strap 58 is linked to the straps 59 and 60, the latter are always moving in the same direction, so that it is sufficient, for example, to connect only the strap 57 to the strap 60 in order at the same time to move the strap 59.

By reciprocating the straps 57 and 58, the drivers 61 and 62, which do not interfere with each other on account of their particular shape and position, are displaced in directions opposite to each other, so that according to which pair of drivers is engaging with a container or its driver 63 (Fig. 4), that container is taken from its storage position in the stack and shifted on the carrier plate 1 or, vice versa, shifted back into the storage position.

An electric motor (Fig. 10) 218 actuates a disc 219 carrying a connecting rod 220, on the free end of which is provided a slide 215 movable in a guide slot 216. A hinge pin 280 connects the slide 215 to the rod 220. The slide 215 carries two rollers 225 and 226, around which two straps 237a and 237b are led in opposite directions. Each of these straps is fixed at one end to a strap holder or bracket 290. The straps 237a and 237b drive a steering slide 320, 321 (Fig. 3) which is operating the straps 5, 6 and the straps 57 and 58.

The raising and lowering of the containers by the straps 5 and 6 and the horizontal displacement of the containers on to the carrier plate and subsequently back to the storage positions by means of the straps 57 and 58, are controlled by the steering slide which consists of two individual slides 320, 321 arranged one above the other (Figs. 11-19). The upper slide 321 is guided by the lower slide 320 on several sides. The lower slide 320 moves in fixed guide rails 322a and 322b (Fig. 15) and has, at a position corresponding to the half-way position of the container when being displaced horizontally, two driver bolts 325 and 326 (Fig. 4) guided in bores 323 and 324 and constantly urged upwardly by spiral springs 327 and 328.

The upper slide 321 is formed with a corresponding bore 329, in which is arranged a counterbolt 330 (Fig. 15). This counterbolt 330 carries a shallow inverted V-shaped member 331 (Fig. 19) extending longitudinally of the slide. The member 331 has its apex located above the counterbolt 330 and the inclined surfaces 331a and 331b slope downwardly towards the ends of the slide. The member 331 and bolt 330 are urged upwardly by helical springs 332 in bores 333, the upper position being determined by a stop 330a.

When the slide moves underneath a selector key 334 bearing a stop 335, the member 331 is depressed and the bolt 330 moves the bolt 325 downwardly until it is below the slide-path 336 (Fig. 19) of the lower slide 320 so that it is possible for the lower slide 320 to be displaced relatively to the upper slide 321 by a pull exerted by the strap 237a (Fig. 11) when the upper slide 321 is blocked by the key stop 335. This is operative until the second bolt 326 comes below the bore 329 of the upper slide 321. In this position, a driver stop 360 (Fig. 15) of the slide 320 strikes against a counterstop 361 of the slide 321. If a stop lever 338 of the upper slide 321 (the function of which is hereinafter referred to) is released, both slides may be moved together. The member 331 then springs upwardly under the action of the springs 332. The bolt 325 enters the bore 329 and connects the slides. In spite of the driver stop 360, this is necessary for the subsequent combined return movement of the slides.

Arranged alongside the member 331 are two stop levers 337 and 338 (Fig. 18) pivoted about pins 339 and 340. Levers 341, 342 are mounted to pivot about pins 343, 344 projecting from the side faces of levers 337, 338 and bear at their lower ends on a surface of the slide 321 (Fig. 14). The free ends of the stop levers 337, 338 are formed with elongated slots in which engage pins 345 projecting laterally from bolts 347 and the stop levers 337, 338 upwardly.

Two vertical arms 349, 350 secured to the lower slide 320 carry inwardly directed pins 351, 352 (Figs. 15 and 16) which are spaced the same distance apart as the bolts 325, 326. When the lower slide 320 has been displaced, in the manner previously described, by the strap 237a, the pin 352 slides in the course of this movement on the lever 342 and thereby depresses the stop lever 338 until it is almost horizontal, so that the upper slide 321 may continue to move underneath the stop 335 of the key 334. This takes place at the moment that the bolt 326 is below the bore 329. The same occurs upon displacement in the opposite direction, when the pin 351 (Fig. 16) presses down the lever 341 and the stop lever 357. In this case also the release takes place when the bolt 325 coincides with the bore 329. As soon as the pins 351, 352 have reached the upper ends of their respective levers 341, 342, the stop levers 337, 338 again spring upwards. This occurs immediately after the key stop 335 has been released. The pins may now pass underneath the levers 341 and 342 in either direction, the lower ends of the latter levers being temporarily raised, as shown at the right in Fig. 14.

The lower slide 320 carries at its end a double roller 353, around which the above-mentioned straps 57, 58 are guided in opposite directions (Fig. 11). The lower ends of these straps are fixed to points on the apparatus at distances corresponding to the length of movement required. The upper slide 321 carries a double-roller 354 (Figs. 11 and 16) around which straps 5 and 6 are passed, the purposes of which have already been described.

If a predetermined container is required, the selector key 334 associated therewith is depressed and is held in the depressed position by locking means consisting of a lateral key projection 362 and a locking plate 363 (Fig. 15). Then a contact key 294 is depressed, which closes the circuit and starts the motor. This tightens the strap 237a and the slides 320, 321 being coupled by the bolts 325 within the bore 329 are moved together towards the right along the guides 322a, 322b, until the stop 335 of the selector key 334 abuts against the front edge of the stop lever 338. The stop lever 337 has been pushed down during this movement and has sprung upwards again under the action of its spring 348, so that the stop 335 of the selector key is located between the front edges of the stop levers 337 and 338. The upper slide 321 is thus blocked against movement in both directions, this occurring just as the carrier plate 1 reaches the bottom of the selected container 34 (Fig. 4). At the same time, however, the bolt 325 is pressed back into the lower slide by the member 331, in the manner already described, and thus, under the tension of the strap 237a, the lower slide continues its movement towards the right below the upper slide 321, until the bolt 326 registers with the bore 329 and, at the same time, the fixed stop 360 prevents further movement in this direction by its engagement with the counterstop 361. Simultaneously, the stop lever 338 is pressed down by the pin 351 until it no longer bears against the stop 335 of the key 334, and consequently the upper slide 321 is released so that it may continue its movement towards the right together with the lower slide 320 until the carrier plate 1 and the container 34 have reached the final working position. During the pulling out of the lower slide with respect to the upper slide, as above described, the container is conveyed in a horizontal direction from its storage place to the carrier plate by means of the double roller 353 and the straps 57 and 58. After the working position has been reached by the container 34, the contact is opened as already described to open the circuit and stop the motor.

When the container is to be returned to its storage place, the contact key is depressed again, whilst the originally selected key 334 has remained in its depressed position due to engagement of a lateral projection 362 under the locking plate 363, which is displaceable by levers 363a against the action of a spring 363b. By means of the strap 237b, the slides 320, 321, being directly coupled by the bolt 326, are displaced together to the left until striking the key stop 335. The member 331 again pushes the bolt 325 back into the lower slide 320 so that this slide may continue moving, whilst the upper slide 321 is retained at the front edge of the stop lever 337 by means of the key stop 335. During this movement, the container is displaced horizontally to its storage place. Finally, the stop lever 337 is pressed down by the projection 352 to such an extent that the upper slide 321 is also set free. The lower slide 320 strikes with its raised part 335 against the upper slide and drives it in order to transport the carrier plate 1 to its lowermost position. Thereupon the bolt 325 again extends into the bore 329 and now both slides are coupled together preparatory to a fresh operation. As the carrier plate reaches its lowest position, it abuts against a driver which, by means of a cable, disengages the above-described locking plate 363 for the key stops 335, 362. Thus, under the action of its spring 334a, the key 334 returns to its initial position.

Figure 2:
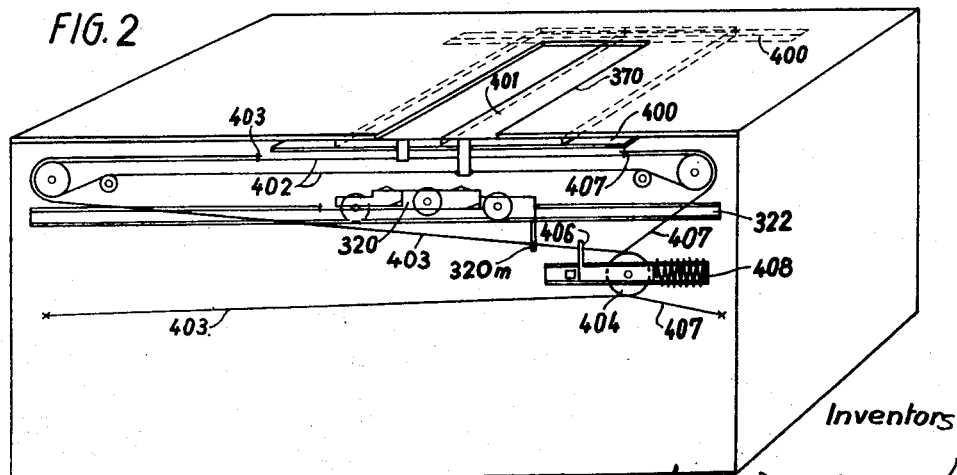
Fig. 2 is a similar perspective view but showing a longitudinal vertical section through the front part of the table at the working place of the containers, the containers' stacks, the container conveying means and their gears having been omitted.

As already stated above, the apparatus according to Figs. 1–3 in the form of a writing table is provided with a window 370 which may be arranged automatically to open and close according to whether or not a container 34 with index cards is in position.

The window 370 is closed by two laterally displaceable plates 401 arranged beneath the window in guides rails 400 (Fig. 2). Both plates 401 are attached to an endless band 402 so that they may always move in opposite directions relatively to each other. The band 402 is driven by a strap 403, which is fixed thereto and is guided around the loose pulley 404. This occurs as soon as a projection 406 on the housing of the loose pulley 404 shifts the housing to its final position. Consequently, the opening is formed shortly before the selected container reaches its working position. The shutting of the plates 401 is effected by another strap 407, working in the opposite direction to the strap 403 and which is also guided around the loose pulley 404, but in the direction opposite to the strap 403. The housing of the pulley 404 is returned to its normal position by the compression spring 408, as soon as the control gear 329 returns to its initial position, thereby closing the window 370.

It may be advantageous to select the next container during the conveyance of the container already selected, but in this case, care must be taken not to interfere with the movement of the first container. For this purpose, the selector keys may be constructed as illustrated in Figs. 20-22. As shown in these figures, the locking plate 410 and the key stop 411 are formed in such a manner that the locking plate not only retains the first depressed key in the operative position, but also prevents any other key from reaching such position. The keys have to pass through holes 412 in the locking plate and by shifting the latter, the holes are also displaced in such a manner that the keys which may be subsequently depressed cannot enter the holes, but are stopped by the plate. The key stop 411 is provided with inclined side edges so that the locking plate, when the first key is depressed, may be shifted laterally against the action of a spring 423. In order to be able to preselect a second container, the key stop 411 and the key 413 consist of separate parts. The key is cylindrically shaped and contains a spring 414 and, below the spring, a plunger 415, the latter being fixed to the stop. The cylinder has lateral slots 416, which enable the key 413 to be depressed against the action of the spring 414, but the key stop cannot move because of the above-mentioned blocking action of the locking plate (Fig. 21). The key cylinder has an inclined projection 417, which may engage under a locking strip 419, and is held by this strip when the latter has been pushed down. The locking strip 419 is similar to the locking plate 410 and is displaceable against the pressure of a spring 418. When a key is depressed, the locking strip 419 is displaced and the key which had previously been depressed now springs back to its inoperative position. However, if the key stop has reached the operative position already at the first selection, it is held fast by the locking plate until the conveying operation has been completed, i. e. until the carrier plate 1 has returned to its initial position. Shortly before this position is reached, the carrier plate 1 strikes against a driver 420 and moves it downwardly, for example on a curved line, so that the driver 420 may spring upwardly again laterally of the carrier plate. The driver 420 is connected to a cable 421 which is led around the guide roller 422 and secured to the locking plate 410 to withdraw the latter. By this means, the key stop is released. At this moment the stop of the other key which has been preselected and depressed, enters the operative position, under the influence of the key spring 414 because the locking plate is no longer effective. The carrier plate 1 may again be conveyed upwardly without interference from the driver 420, which may swing upwardly and out of the path of the plate 1.

It may be advantageous to arrange that, in known manner, the depression of a key for initiating the upward conveying movement simultaneously starts the motor. If the selected container is to be brought back to the storage place, it is sufficient then merely to select the next container in order simultaneously to close the electric circuit. Obviously, it will be necessary to provide an additional key which is not associated with any of the containers so that the selected container may be returned to the pile if another is not required. The keys may also be arranged on a sunk panel on the table top and the key index may be adapted to light up electrically. In addition, a small electric bulb may be fitted to each key which is illuminated as soon as a container leaves its storage place. It will be sufficient to arrange a spring contact for each container in the container storage stack which is opened as a container is taken from the stack.

Another embodiment of a control slide suitable for simultaneously conveying several containers and which comprises a plurality of relatively individual movable slides is illustrated in Figs. 23 to 25. With this construction, two stacks of containers may be provided and it is possible to so control the movement of the carrier plate that during a vertical conveying operation, it may stop several times for transporting a plurality of containers which are disposed at different heights in the stacks, and which are located side by side or opposite one another.

Assuming that the carrier plate is arranged to pick up and convey two containers, this control slide is as constructed in Figs. 23, 24 and 25, and comprises a displaceable base plate 440 moving in lateral guides 441, 442, an upper slide 443 and two intermediate slides 444 and 445 arranged side by side between the base plate 440 and the upper slide 443. The slides differ from those in the earlier figures in that their guide pulleys for controlling the cable drive are arranged horizontally instead of vertically. This gives a simplified construction and enables the cables to be guided without providing special slots in the relatively movable parts for the cable pulleys.

The upper slide 443 controls the vertical movement of the carrier plate and is provided with a pair of cable pulleys 446, around which are led the above described cables 5 and 6 for the drive of the carrier plate. The two intermediate slides 444 and 445 control the horizontal displacement of the containers from the stack on to and off of the carrier plate. These slides are juxtaposed on the same plane and carry pairs of cable pulleys 447 and 448, around which are led the above described cables 57, 58 and 57m, 58m, respectively, for moving the drivers along the guides of the carrier plate.

The three slides 443, 444 and 445 are movably mounted on the base plate 440. The part of the upper slide 443, which is located behind the cable pulleys 446, is recessed to receive complementary shaped parts of the intermediate slides 444 and 445. As shown in Fig. 23, the top slide 443 is guided on the base plate 440 by a projection 449 and its movement is limited by the intermediate slides 444 and 445, which bear directly on the base plate 440.

The displaceable base plate 440 is provided at both ends with eyes 450 and 451, to which are connected the cables 237a and 237b (see Figs. 3 and 10) for transmitting the motor drive. The upper slide 443 has two lateral platforms 452 and 453 (Fig. 24) on which are arranged the stop means and locking means, already described with reference to Figs. 4 to 12, and which control the co-operation of the slides with the key stops to be actuated by the user. These means arranged on the platform 452 control the intermediate slide 444, and those on platform 453 control the slide 445. The two slides 444 and 445 are capable of moving independently of each other. Conforming to the duplication of the stop means and locking means, the selector keys must also be arranged in two adjacent rows. For each row of selector keys only the lower ends 454 and 455 respectively, of one key of a row are shown in Fig. 25. The key 454 is shown depressed.

The movement of the slides must be operated in such a manner that the upper slide 443 for the control of the vertical conveyance of the carrier plate 1 may be interrupted temporarily to cause the carrier plate to stop at a predetermined height, whilst one of the intermediate slides 444 and 445 continues to move with the base plate to shift a container horizontally from the stack on to the carrier plate, or vice versa. For this purpose, stop means and locking devices must be provided to enable the slides 443, 444 and 445 to participate in the movement of the base plate 440, or remain stopped for a time independently of each other, while the base plate continues to move on with only one of the two intermediate slides 444 and 445.

For this purpose, additional locking means 456, 457 are provided on each of the platforms 452 and 453, these being in addition to the stops 337, 338 and locking means 331, the operation of which have been described in detail in connection with Figs. 11 to 16. The operation of the additional locking means 456, 457 will be described hereafter. It is pointed out that the projections 351 and 352 illustrated in Figs. 11 to 16 are arranged externally of the intermediate slides 444 and 445 in the construction illustrated in Figs. 24 and 25.

Corresponding to the different stopping ranges of the slides 443, 444 and 445, the base plate 440 is provided on both longitudinal sides within the range of movement of the additional locking means 456, 457, with three suitably spaced bolts 458 (Fig. 23). In the same range, the intermediate slides 444 and 445 are provided with two spring bolts 459, which are the same distance apart as the spring bolts 458. These spring bolts are controlled by the additional locking means 456 and 457 respectively, and co-operate with a plate 460 fixed to the lower end of a coupling bolt 461 which can penetrate by its end entering into an opening 462 in the upper slide 443.

The movements of the control gear during the operation of conveying the carrier plate upwardly from its bottom position to its arrival at the working position are as follows: When the carrier plate is in its bottom position, the upper slide 443 is connected with the base plate 440 by the coupling bolt 461 and with the intermediate slides 444 and 445 by means of the spring bolts 459. The base plate 440 is now shifted to the right by the pull on the cable secured to the eye 451, and all the slides 443, 444 and 445 move together with the base plate. By this movement of the slide 443, the vertical upward movement of the carrier plate is initiated. As soon as one of the platforms 452 and 453 with its stop means and locking means strikes against a depressed key 454, all the operations previously described in connection with the stops 337, 338 and locking means 441 take place. The key 454 will be disposed between the stops 337 and 338, thus temporarily stopping the movement of the upper slide 443. At the same time, by pushing down the locking means 331, the connection between the upper slide 443 and the intermediate slide 444 is broken. The additional locking lever 456 is also simultaneously pushed down to depress the spring bolts 459 and 458 and, as is apparent from Fig. 25, and the plate 460 with its coupling bolt 461 is pressed down and thus the coupling between the upper slide 443 and the base plate 440 is also broken.

The upper slide 443 is now stopped by the key 454, while the intermediate slide 444 may continue to move with the base plate 440 and displaces the container horizontally from the stack on to the carrier plate by means of the cables 57 and 58.

This horizontal displacement of the container is always over a fixed path of uniform length, which is determined at the control gear by the distance between the stops 351 and 352. As soon as the stop 351 overcomes the locking action of the lever 337 and the platform 452 has moved beyond the key 454, the locking means 331 and 456 snap upwards, thus disengaging the slide 444 from the base plate, while simultaneously the upper slide 443 is connected to the base plate by means of the bolt 461. During the further displacement of the base plate 440 together with the top slide 443, the carrier plate will continue to move upwardly. During this upward movement, the same operations may be repeated in any other position in connection with the intermediate slide 445, before the carrier plate reaches its final position.

It may be mentioned that during the temporary displacement of the intermediate slide 444, with the upper slide 443 stationary, the spring bolt 459 moves out of the range of the locking lever 456, because the bolt 459 is mounted on the intermediate slide 444. In order to ensure that the spring bolt 459 is kept depressed during this time, a spring-controlled bolt 463 is provided to project into a recess in the depressed spring bolt 459 and to remain therein until released by means of a particular stop. This stop (not shown) is mounted in such a manner that its position corresponds to that of the projection 351. A groove 464 is provided on each side of the upper slide 443 to permit free movement of the upper end of the spring bolt 459.

A modified form of the conveying mechanism described above is used for the shelf apparatus in Figs. 6 and 7, the reference numerals being the same as in the system of the table apparatus. As already stated above, the container stacks 382, 34a and 34b are arranged above the working place 383 instead of below, and consequently the initial position of the carrier plates 1a, 1b or 1a, 1c is also at the top. Instead of two facing stacks of containers, these are arranged adjacent one another in this example on one side only of the carrier plate, which is also moved up and down along one edge only and is supported by a bracket 384 running along a guide rail 380.

In this example, the straps 5a, 5b, 57 and 58 for the vertical and horizontal movements may be led directly around the corresponding pulleys 354, 353 (Figs. 6 and 7) of the control gear 320, the straps being disposed in pairs in opposite directions to each other. These straps are also provided with slots and pass at their upper end around a cam wheel 2, which is connected by means of the shaft 381 with the endless supporting strap 3 on the other side of the container so that the latter strap 3 is also driven.

Several containers may be transported side by side on the carrier plates 1a, 1b or one above another on the plates 1a, 1c in one vertical conveying movement. If the container stacks are arranged side by side (34a, 34b) it is possible to convey one container from each pile by means of a common carrier plate 1a, 1b, which runs along both stacks (Figs. 6 and 8) and which has two horizontal conveyor devices which may be operated separately according to the positions of the selected containers in the respective stacks. However, if two containers have to be taken from the same pile during a single vertical movement, it is necessary to provide the carrier plate 1 with the superstructure 1c (Fig. 9) which serves as a second carrier plate and possesses a special horizontally acting conveying mechanism for the shifting of the second container. Of course, a control gear having two drivers for the horizontal movements must be employed.

This device according to the invention is suitable not only for all kinds of card registers, but also for storing various kinds of articles automatically in stacks. The device can be used as magazine shelves, racks in stores, office cabinets, and for many other purposes, in which the automatic conveyance of articles in different directions is essential.

Parts of the mechanism above described, particularly the control gear, are suitable for use in other conveying devices for account cards, index cards and other subjects. Some parts have an independent importance, i. e. the control gear, which may be used generally in conveying mechanisms and devices of different kinds.

If several drivers are provided, the control gear can be employed for conveying devices working in different directions. The device may also be constructed so as to work in only one direction, with repeated interruptions of the conveying operation. This may be advantageous, for instance, in storage apparatus when the carrier plate, having been automatically loaded, is to be discharged in the same direction after the conveying operation has been completed.

We claim:

1. A device for storing and conveying containers of index cards and other articles, comprising in combination a carrier plate for the vertical transportation of the containers, a rope gear provided with fixed and movable guide rollers for driving the carrier plate in vertical direction, movable drivers being attached in pairs to horizontal guides on opposite sides of the carrier plate, an additional rope gear for propelling said movable drivers and being fixed to the underside of said carrier plate, both rope gears being operated by a common moving force, and movable control means for distributing the common moving force to the rope gears in such a manner, that one rope gear is stopped while the other is moving.

2. A device for storing and conveying containers of index cards and other articles, comprising in combination a carrier plate for the vertical transportation of the containers, movable drivers attached in pairs to horizontal guides on opposite sides of said carrier plate, a rope gear for the common drive of the carrier plate and of its movable drivers, a number of slides movably mounted within said gear and bearing rope wheels of the gear, ropes conducted in opposite directions around said rope wheels of the slides with their ends connected to the individual driving systems for the vertical movement of said carrier plate and for the horizontal movement of the said movable drivers.

3. A device for storing and conveying containers of index cards and other articles, comprising in combination a frame construction wherein the containers are arranged in stacks; a carrier plate movable on guides in same frame for the vertical transportation of the containers, movable drivers attached in pairs to horizontal guides on opposite sides of said carrier plate, a rope gear for the common drive of the carrier plate and of its movable drivers, a number of slides movably mounted within said gear and bearing rope wheels of the gear, and ropes being conducted around the rope wheels of said slides, one rope being attached with one end to said frame construction, and the other end to a movable part of the driving system.

4. A device for storing and conveying containers of index cards and other articles, comprising in combination a frame construction wherein the containers are arranged in stacks; a carrier plate for the vertical transportation of the containers, movable drivers attached in pairs to horizontal guides on opposite sides of said carrier plate, a rope gear for the common drive of the carrier plate and of its movable drivers, a number of slides movably mounted within said gear and bearing rope wheels of the gear, ropes conducted around the rope wheels of said slides, one rope being attached with one end to said frame construction, and the other end to a movable part of the driving system, a motor, a crank gear connecting the motor with one of said slides, a contact key provided with a spring, and an uncoupling lever for said contact key, said lever being controlled by a movable part of said rope gear.

5. A device for storing and conveying containers of index cards and other articles, comprising in combination a carrier plate for the vertical transportation of the containers, movable drivers attached in pairs to horizontal guides on opposite sides of said carrier plate, a rope gear for the common drive of the carrier plate and of its movable drivers, a plurality of selecting keys for temporarily interrupting the vertical movement of said carrier plate and a multiple slide movable on linear guides within the range of said keys and consisting of individual slides movable against each other, one of which controls the movement of the carrier plate, another the movement of the drivers movably mounted on it.

6. A device for storing and conveying containers of index cards and other articles, comprising in combination a carrier plate for the vertical transportation of the containers, movable drivers attached in pairs to horizontal guides on opposite sides of said carrier plate, a rope gear for the common drive of the carrier plate and of its movable drivers, a plurality of selecting keys for temporarily interrupting the vertical movement of said carrier plate, a multiple slide movable on linear guides within the range of said keys and consisting of individual slides movable against each other, one of which being provided with movably mounted stops projecting into the range of said keys and cooperating therewith, and another being provided with means for displacing and controlling said movable stops with regard to their cooperation with said keys.

7. A device for storing and conveying containers of index cards and other articles, comprising in combination a carrier plate for the vertical transportation of the containers, movable drivers attached in pairs to horizontal guides on opposite sides of said carrier plate, a rope gear for the common drive of the carrier plate and of its movable drivers, a system of selecting keys for temporarily interrupting the vertical movement of said carrier plate, a multiple slide movable on linear guides within the range of said keys and consisting of individual slides movable against each other, the one of which controls the movement of the carrier plate, another the movement of the drivers movably mounted on it, and rope wheels arranged on said individual slides, said rope wheels being in parallel relation with the main plane of said individual slides.

8. A device for storing and conveying containers of index cards and other articles, comprising in combination a carrier plate for the vertical transportation of the containers, movable drivers attached in pairs to horizontal guides on opposite sides of said carrier plate, a rope gear for the common drive of the carrier plate and of its movable drivers, a system of selecting keys for temporarily interrupting the vertical movement of said carrier plate, a multple slide movable on linear guides within the range of said keys, said multiple slide comprising a shiftably mounted base plate, a top slide mounted on said base plate for controlling the vertical movements of the carrier plate, and a plurality of intermediate slides disposed side by side on said base plate and controlling the horizontal movement of the containers, said top slide and said intermediate slides being in overlapping, box-like relation with each other and carrying a plurality of counterstops and locking means, said locking means comprising a number of spring bolts disposed in said slides and in said base plate spaced equal horizontal distances apart and adapted to overlie each other in the course of the movements of the slides.

9. A device for storing and conveying containers of index cards and other articles, comprising in combination a frame wherein the containers are arranged in stacks, a carrier plate for the transportation of the containers, movable drivers attached to guides on opposite sides of said carrier plate, a rope gear for the common drive of the carrier plate and of its movable drivers, displaceable steering means sliding on guides beyond the path of said carrier plate and being in driving relation with said rope gear, and a system of keys disposed in the path of said steering means and cooperating therewith, said sliding steering means stopping the carrier plate on a desired level of its path by their cooperation with said keys.

10. A device for storing and conveying containers of index cards and other articles according to claim 9, comprising a frame wherein the containers are arranged in several stacks lying side by side in one straight plane, and a carrier plate movable on the plane front side of said frame and arranged as a common means for the transportation of the containers in the different stacks.

11. A device according to claim 9, comprising in combination a frame with at least two container stacks facing each other, a carrier plate arranged between said stacks for the transportation of the containers, and pairs of movable drivers on each of the opposite sides of the carrier plate, the two drivers of each side of the carrier plate being disposed and shaped for passing each other when being moved for shifting the containers from different sides on the carrier plate.

12. A device according to claim 9, comprising a carrier plate adapted for bearing several containers to be placed simultaneously thereon, and movable drivers arranged in pairs and attached to guides of said carrier plate in such quantity that several containers can be shifted on said carrier plate for common transportation.

13. A device according to claim 9 comprising a carrier plate for the transportation of the containers, movable drivers attached to guides on said carrier plate, and guide rollers disposed on the lower side with their axes rectangular to the plate for guiding said rope gear on the lower side of the plate.

14. A device according to claim 9, wherein the keys cooperating with the sliding steering means for stopping the carrier plate each consist of two parts movably arranged against each other with springs interposed between them, said keys cooperating with movably placed locking contrivances individually provided for each of said movable parts of the keys.

ALBERT NUSSBAUM.
OTTO ALFRED BECKER.

References Cited in the file of this patent

UNITED STATES PATENTS

| Number | Name | Date |
| --- | --- | --- |
| 1,266,262 | Hetzel | May 14, 1918 |
| 1,375,241 | Trew | Apr. 19, 1921 |
| 2,194,912 | Regan | Mar. 26, 1940 |
| 2,270,896 | Rippon | Jan. 27, 1942 |
| 2,386,520 | Watson | Oct. 9, 1945 |

OTHER REFERENCES

Ser. No. 273,370, Becker (A. P. C.), published April 27, 1943.